United States Patent Office 3,579,527
Patented May 18, 1971

3,579,527
N-SUBSTITUTED PYRIDO-INDOLE DERIVATIVES
Meier E. Freed, Philadelphia, Pa., assignor to American Home Products Corporation, New York, N.Y.
No Drawing. Original application June 27, 1966, Ser. No. 560,811. Divided and this application July 18, 1969, Ser. No. 870,805
Int. Cl. C07d 39/00
U.S. Cl. 260—296
2 Claims

ABSTRACT OF THE DISCLOSURE

N-substituted-tetrahydropyrido-indoles are prepared having useful pharmacological activity, particularly on the central nervous system.

The present application is a division of application, Ser. No. 560,811, filed June 27, 1966, and now U.S. 3,497,507.

This invention relates broadly to pyridyl derivatives and more particularly to N-substituted pyrrolo-pyridines, the acid-addition and quaternary ammonium salts thereof and to methods for their preparation.

Compounds of the invention may be illustrated by the formula:

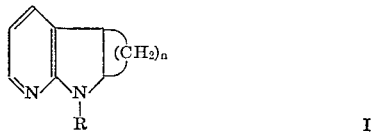

wherein R is intended to represent an alkyl or substituted alkyl chain. Thus, R is intended to represent an alkyl, aryloxyalkyl or arylalkyl radical, or an aminoalkyl, alkylaminoalkyl, dialkylaminoalkyl or a heterocyclic nitrogen-containing radical attached to the alkyl chain, such as pyrrolidinoalkyl, piperidinoalkyl or morpholinoalkyl. The ring containing the designation $(CH_2)_n$ is intended to represent a polymethylene ring, with $n$ standing for an integer from 4 to 11 inclusive.

The above compounds and their salts have central nervous system action, demonstrating stimulant and psychic energiser activity as well as an ability to counteract symptoms related to parkinsonism.

In preparing compounds falling within the designated Formula I, the selected pyrrolo-pyridine is first reacted with an alkali metal or alkali metal derivative to activate the pyrrolo nitrogen. For this purpose, one may use an alkali metal, such as sodium or potassium, alkali metal hydrides, preferably sodium hydride, alkali metal amides, such as sodamide or potassium amide, or alkali metal alcoholates, preferably sodium ethylate. This reaction is normally carried out using a solvent such as benzene, toluene, dimethyl-formamide, dimethylacetamide or dimethylsulfoxide. Following the formation of the sodio or potassic derivative, the latter is then reacted in one of a number of ways.

One route is to react the alkali-activated compound with an alkyl or aminoalkyl halide, for example, trimethylene chlorobromide or aminoethylchloride.

When using a dihalide, the reaction product which now contains a halogen atom on the alkylene chain is then treated with an amine or nitrogen-containing heterocyclic, thus forming, by this route, a compound of Formula I.

When the alkali-activated compound is reacted with an alkyl halide or aminosubstituted alkyl halide or similar reactant, compounds of Formula I are directly formed.

Alternatively, one may react the activated pyrrolo-pyridine compound with a cyano compound having an unsaturated alkyl chain, for example, acrylonitrile or vinylacetonitrile. The cyanoalkyl-pyrrolopyridine may then be reduced, using for example, lithium aluminum hydride, thus converting the cyano group to an amino radical. To make the N-mono or N,N-disubstituted amino compound, or its equivalent, the unsubstituted amino is reacted with the appropriate halide in known manner.

To further illustrate the routes leading to the preparation of the compounds of Formula I, the following flow-diagram will show the various methods:

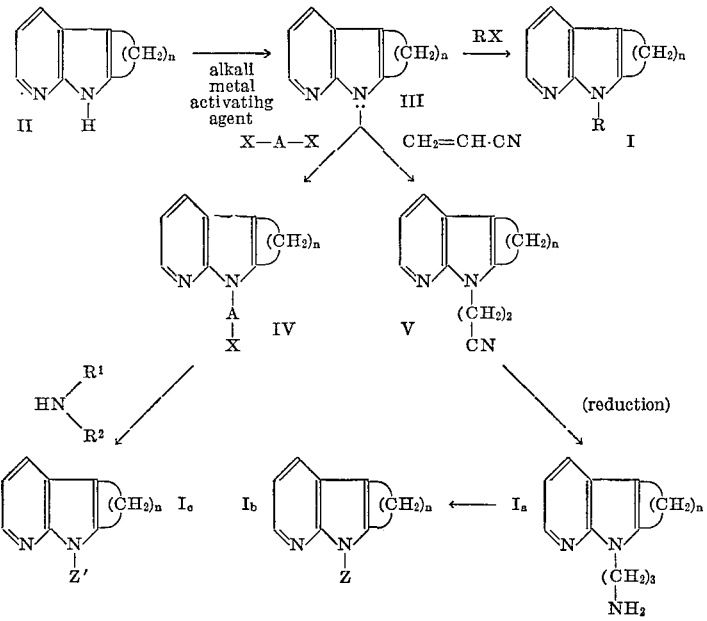

In the above illustrative flow diagram, it will be seen that the compounds of Formula I may be made by different routes as shown, the selected route at times depending on the type of compound desired. The letters R and $n$ have the same meanings as previously given. The letter A is intended to represent a lower alkylene radical. The designation X is intended to stand for a halogen atom, preferably chlorine or bromine. The amino reactant

is intended to stand for a primary or secondary alkylamine with $R^1$ and $R^2$ representing hydrogen or lower alkyls of 1 to 3 carbon atoms, but these may be connected together with the nitrogen atom to represent a nitrogen-containing heterocyclic radical, for example, pyrrolidine, piperidine or morpholine. The symbol Z is intended to represent a mono- or di-lower alkylaminoalkyl chain, while the symbol Z' is similar to Z but in addition may represent a 5- or 6-membered heterocyclic nitrogen-containing radical.

The starting compounds, represented by Formula II, may be prepared in known manner, if not commercially available. One procedure for making the tricyclic compounds is disclosed by Okuda et al., J.A.C.S. 81, p. 740 (1959).

As intended previously, the compounds are also useful either as non-toxic, pharmaceutically acceptable mono- or di-acid-addition salts or as quaternary ammonium compounds. These may be prepared in known manner, utilizing the selected mineral or organic acid or hydrocarbon halide as the case may be. The reaction is generally carried out in an organic solvent, for example ether. Typical acids may be hydrochloric, sulfuric, phosphoric, acetic, fumaric or maleic acids. For preparing the quaternary salts, the base is reacted with the selected halide, for example methyl or benzyl chloride.

The compounds may be administered orally or parenterally, either in a single dose within the range of 1 mg. to 200 mg. per kilogram of body weight per day, or in divided doses, in the form of tablets, capsules or as solutions or suspensions. If desired, the solids may include carriers, excipients or diluents. The liquid form may be either aqueous or oleagenous.

The following examples are given for more specific illustration of typical methods for preparing selected compounds, but should not be taken as limitative of the invention.

EXAMPLE 1

A solution of 5,6,7,8 - tetrahydro - 9H-pyrid[2,3-b]-indole (4.0 g., 0.0232 mole) in dimethyl formamide (35 ml.) was added to a stirred suspension of sodium hydride (1.15 g., 0.0256 mole of a 53% dispersion in mineral oil). Stirring was continued for 1 hour at room temperature. Freshly distilled β-diethylaminoethylchloride (3.15 g., 0.0232 mole) was added. Stirring was continued at 40–50° C. for 4½ hours, then at room temperature for 20 hours. The mixture was poured into ice water (400 ml.) and treated with acetic acid to pH6. It was extracted with ether (3 portions, 100 ml. each). The aqueous phase was made strongly basic with excess sodium hydroxide (50% aqueous solution) and extracted with ether (4 portions, 250 ml. each and 1 portion of 100 ml.). The ethereal extracts were combined, washed twice with saturated aqueous sodium chloride solution and dried over anhydrous magnesium sulfate. Removal of the drying agent and the solvent gave the crude base as an oil, 5.9 g. The base was dissolved in ether (400 ml.) and treated with anhydrous hydrogen chloride. The desired product, 9 - [2 - (diethylamino)-ethyl] - 5,6,7,8 - tetrahydro - 9H - pyrido[2,3-b]indole as the hydrochloride salt, was collected by filtration and recrystallized from methanol-acetone to give the product, 4.25 g., melting at 235°–237° C.

*Analysis.*—Calcd. for $C_{17}H_{27}Cl_2N_3$ (percent): C, 59.31; H, 7.91; Cl, 20.59; N, 12.21. Found (percent): C, 59.81; H, 7.89; Cl, 20.30; N, 12.00.

A second crop was obtained, 0.76 g., melting at 232°–235° C., bringing the total yield to 62.9%.

EXAMPLE 2

11-[2-(diethylamino)ethyl] - 5,6,7,8,9,10 - hexahydro-11H - cyclooct[4,5]-pyrrolo[2,3-b]pyridine is prepared from 5,6,7,8,9,10-hexahydro - 11H - cyclooct[4,5]pyrrolo-[2,3-b]pyridine, sodium hydride and β-diethylaminoethylchloride in dimethyl formamide in the same manner as described in Example 1. The hydrochloride melts at 178–181° C.

*Analysis.*—Calcd. for $C_{19}H_3Cl_2N_3$ (percent): C, 61.30; H, 8.39; Cl, 19.04; N, 11.29. Found (percent): C, 61.77; H, 8.17; Cl, 18.90; N, 11.18.

EXAMPLE 3

9 - [3 - (dimethylamino)propyl] - 5,6,7,8 - tetrahydro-9H - pyrido - [2,3-b]indole is prepared from 5,6,7,8-tetrahydro - 9H - pyrid[2,3-b]indole, sodium hydride and γ-dimethylaminopropyl chloride in dimethyl formamide in the same manner as described in Example 1. The hydrochloride melts at 229–232° C.

*Analysis.*—Calcd. for $C_{16}H_{25}Cl_2N_3$ (percent): C, 58.16; H, 7.63; Cl, 21.47; N, 12.72. Found (percent): C, 58.02; H, 7.81; Cl, 21.00; N, 12.9.

EXAMPLE 4

11 - [3 - (dimethylamino)propyl] - 5,6,7,8,9,10 - hexahydro - 11H - cyclooct - [4,5]pyrrolo[2,3-b]pyridine is prepared from 5,6,7,8,9,10 - hexahydro - 11H - cyclooct[4,5]pyrrolo[2,3-b]pyridine, sodium hydride and γ-dimethylaminopropyl chloride in dimethyl formamide in the same manner as described in Example 1. The hydrochloride melts at 190–195° C.

*Analysis.*—Calcd. for $C_{18}H_{29}Cl_2N_3$ (percent): C, 60.35; H, 8.15; Cl, 19.77; N, 11.73. Found (percent): C, 60.85; H, 8.36; Cl, 19.60; N, 12.13.

EXAMPLE 5

5,6,7,8,9,10 - hexahydro - 11 - (2 - morpholinoethyl)-11H - cyclooct[4,5]pyrrolo[2,3-b]pyridine is prepared from 5,6,7,8,9,10 - hexahydro - 11H - cyclooct[4,5]pyrrolo[2,3-b]pyridine, sodium hydride and β - morpholinoethyl chloride in dimethyl formamide in the same manner as described in Example 1. The hydrochloride melts at 263–266° C.

*Analysis.*—Calcd. for $C_{19}H_{29}Cl_2N_3O$ (percent): C, 59.08; H, 7.57; Cl, 18.35; N, 10.86. Found (percent): C, 59.12; H, 7.77; Cl, 18.00; N, 10.57.

EXAMPLE 6

9 - [2(morpholino)ethyl] - 5,6,7,8 - tetrahydro - 9H-pyrido[2,3-b]indole was prepared from 5,6,7,8-tetrahydro-9H-pyrid[2,3-b]indole, sodium hydride and β - morpholinoethyl chloride in dimethyl formamide in the same manner as described in Example I. The hydrochloride melted at 234–237° C.

*Analysis.*—Calcd. for $C_{17}H_{25}Cl_2N_3O$ (percent): C, 57.00; H, 7.03; Cl, 19.77; N, 11.73. Found (percent): Cl, 19.65; N, 11.79.

EXAMPLE 7

A solution of 5,6,7,8,9,10 - hexahydro - 11H - cyclooct[4,5]pyrrolo[2,3-b]pyridine (5.0 g., 0.025 mole) in dimethyl formamide (50 ml.) was added to a suspension of sodium hydride (1.42 g., 0.0325 mole, of a 55% dispersion in mineral oil) in dimethyl formamide. The mixture was stirred for 1¾ hours after completed addition. A solution of β-bromophenetole (5.03 g., 0.025 mole) in dimethyl formamide (50 ml.) was added over a period of 3 hours. The reaction mixture was stirred at room temperature for 17 hours, then at 50° C. for an additional period of 2 hours. The mixture was cooled and poured into 500 ml. water. A yellow solid formed; this was filtered off, washed, dried and recrystallized from aqueous ethanol to give 5,6,7,8,9,10 - hexahydro-11-(2-phenoxyethyl) - 1H - cyclooct[4,5]pyrrolo[2,3-b]pyridine, 7.12 g. (88.9% yield) melting at 83–86° C. The hydrochloride was prepared by treating an alcoholic solution of the base with saturated alcoholic hydrogen chloride and diluting with ether. After recrystallizing from ethanol-ether, the salt melted at 213.5–217° C.

*Analysis.*—Calcd. for $C_{21}H_{25}ClN_2O$ (percent): C, 70.70; H, 7.07; Cl, 9.93; N, 7.85. Found (percent): C, 70.83; H, 7.01; Cl, 9.9; N, 7.73.

In the same manner as disclosed in Example 1 or 7 using the appropriate starting materials, one may prepare the following compounds:

9[2-pyrrolidinoethyl]-5,6,7,8-tetrahydro-9H-pyrido [2,3-b]indole.
9[2-piperidinoethyl]-5,6,7,8-tetrahydro-9H-pyrido [2,3-b]indole.
9[2-piperazinoethyl]-5,6,7,8-tetrahydro-9H-pyrido [2,3-b]indole.
11[2-(dimethylamino)2-methylethyl]-5,6,7,8,9,10-hexahydro-11H-cyclooct[4,5]pyrrolo[2,3-b]pyridine.
13[3-(dimethylamino)propyl]-5,6,7,8,9,10,11,12-octahydro-13H-cyclodec-[4,5]pyrrolo[2,3-b]pyridine.

Other compounds falling within the scope of the inventive concept may also be prepared as indicated:

11-[3 - aminopropyl] - 5,6,7,8,9,10 - hexahydro - 11H-cyclooct-[4,5]pyrrolo[2,3-b]pyridine may be obtained by LiAlH$_4$ reduction of the corresponding nitrile, which in turn is obtainable by treatment of the 11-unsubstituted compound with acrylonitrile.

11 - [3 - (methylamino)propyl] - 5,6,7,8,9,10 - hexahydro - 11H - cyclooct[4,5]pyrrolo[2,3-b]pyridine may be obtained by treating the 3-aminopropyl product of the preceding example with chloral followed by a reduction step using lithium aluminum hydride. To obtain a dimethylaminopropyl chain, the product of the preceding example is treated with formic acid-formaldehyde under the usual conditions for a Leuchart reaction.

9 - [2 - (dimethylamino) - 2 - (methyl)ethyl] - 5,6,7,8,-tetrahydro-9H-pyrido[2,3-b] indole may be obtained in the manner exemplified by Example 1 by using 2-dimethylaminoisopropylchloride as the aminohalide.

I claim:
1. 9 - [2 - (diethylamino)ethyl] - 5,6,7,8 - tetrahydro-9H-pyrido[2,3-b]indole.
2. 9 - [3 - (dimethylamino)propyl]-5,6,7,8-tetrahydro-9H-pyrido[2,3-b]indole.

References Cited
UNITED STATES PATENTS 2,688,022   8/1954   Burtner _____ 260—296

HENRY R. GILES, Primary Examiner

S. D. WINTERS, Assistant Examiner

U.S. Cl. X.R.
260—247.5